United States Patent Office 3,474,076
Patented Oct. 21, 1969

3,474,076
METHOD OF PREPARING SOLUBLE BINDERS
Horst Dalibor and Hans-Joachim Kiessling, Hamburg, Germany, assignors to Reichhold Chemicals, Inc., White Plains, N.Y.
No Drawing. Filed Mar. 10, 1967, Ser. No. 622,090
Claims priority, application Germany, Mar. 28, 1966, R 42,947
Int. Cl. C08f *15/36, 15/34, 15/02*
U.S. Cl. 260—78.5                                                         13 Claims

ABSTRACT OF THE DISCLOSURE

The present application discloses that it is possible to obtain soluble, broadly applicable binders for coating compositions of copolymers, prepared in a known manner by a free radical-suspension polymerization process, containing copolymerized therein, aside from at least two other unsaturated monomers, an appreciable amount, such as 1% by weight up to 23 mole percent by weight, preferably 5 to 12 mole percent by weight of an $\alpha,\beta$-unsaturated dicarboxylic acid anhydride, are heated at reaction temperature with polyols or mixtures of polyols, if necessary also mixtures of the latter with di- or monoalcohols, until a product with an acid number of 5 to 60, preferably 20 to 50, and a hydroxyl number of 20 to 120, preferably 30 to 90, is obtained.

---

In carrying out the process of the present invention it is essential that there is always included either in whole or in part a trivalent alcohol. According to a preferred embodiment of the present invention, the inclusion of divalent-alcohols and monoalcohols is dispensed with and the reaction is carried out solely with a triol. While it is possible to use the simplest available triol, i.e. glycerin, for reaction with the aforesaid copolymers, it is preferred to use less polar triols, such as hexanetriol-1,2,6 or trimethylolalkanes, as for example trimethylolpropane and trimethylolethane.

Of these trivalent alcohols that are less polar than glycerin, the most suitable for carrying out the process of the present invention is trimethylolpropane, wherein for each mole of anhydride in the copolymer there are used 0.18 to 1.5 mole, preferably 0.8 to 1.2 mole of trimethylolpropane.

By the partial reaction of the copolymers having an appreciable amount such as one percent by weight, up to about 23 percent by weight, preferably of 5 to 10 mole percent, of an $\alpha,\beta$-unsaturated dicarboxylic acid anhydride, with polyols of the aforesaid type, it is possible to obtain soluble reaction products which, aside from an acid number from 5 to 60, preferably from 20 to 50, possess a hydroxyl number of 20 to 120, preferably of 30 to 90.

The reaction products of soluble copolymers and polyols prepared in accordance with the present invention are suitable as single binders for quick-drying, strongly adhering and, depending upon the composition of the monomer mixture, hard to flexible, preferably oven-drying coatings that firmly adhere to metals, glass, ceramic or artificial resin surfaces, leather and the like. By applying baking temperatures of 180 to 200° C., it is possible to obtain excellent benzine- and water-resistant coatings. By the combined use of urea-, aminotriazine-, or phenolformaldehyde resins it is, furthermore, possible to lower the baking temperatures and also improve the properties, for example the hardness of the coatings.

In carrying out the process according to the present invention, the content of free hydroxyl groups possessed by the reaction products of copolymers and polyols is a prerequisite for the combination and compatibility with urea-, aminotriazine- and phenol-formaldehyde resins and for the cross-linking reactions with the methylol- or methylolether groups that are promoted by the free carboxyl groups. The most desirable are combinations of the copolymers modified by reaction with triols and etherified melamine-formaldehyde condensation products.

For the use of the resinous materials in accordance with the present invention, as binders for coating compositions, particularly in the form of elasticity-imparting components together with hardenable resinous condensation products, the structure as well as the composition of the starting polymers that are reacted with polyols, is of considerable importance. Aside from $\alpha,\beta$-unsaturated dicarboxylic acid anhydrides, the following monomers can be used for the preparation of the copolymers: acrylic acid esters, methacrylic acid esters, styrene and substituted styrenes, such as vinyltoluene, vinylxylene, nuclear-halogenated styrenes, mono-olefines that are unbranched at the double-bond, as well as difficultly saponifiable vinyl esters, such as vinyl esters of carboxylic acids branched at the $\alpha$-position. The selection of the comonomer mixture forming the copolymers to be reacted with polyols depends upon the particular use contemplated for the modified copolymers as binders for coating compositions and, based upon the nature of the rigid or flexible surfaces to be coated, must generally conform to the desired properties such as hardness and elasticity. The copolymers reacted with polyols in their hard as well as in their softer and more flexible form, when used as binders in coating compositions, must quickly yield non-sticky dry films.

Monomers that are capable of imparting hardness properties to the copolymers are for example methylmethacrylate, aromatic vinyl hydrocarbons, such as styrene, vinyl esters of short-chain carboxylic acids branched at the $\alpha$-position, such as vinylpivalate, acrylic acid esters with two or more carbon atoms in the alcohol component, methacrylic- and fumaric acid esters with four or more carbon atoms in the alcohol component, which when used as comonomers, impart softness and elasticity to the copolymer if the alcohol component in these ester monomers is unbranched. Also $\alpha$-olefines having six or more carbon atoms in unbranched chains can be used as comonomers to impart elasticity to the copolymer.

RELATED APPLICATIONS

The present application is related to the following: (1) U.S. application Ser. No. 622,080, filed Mar. 10, 1967, corresponding to German application R 42,944, filed March 28, 1966; (2) U.S. application Ser. No. 622,039, filed Mar. 10, 1967, corresponding to German application R 42,945, filed March 28, 1966; (3) U.S.

application Ser. No. 622,112, filed Mar. 10, 1967, corresponding to German application R 42,946, filed Mar. 28, 1966; (4) U.S. application Ser. No. 622,041, filed Mar. 10, 1967, corresponding to German application R 42,948, filed Mar. 28, 1966.

The present invention has as its object the provision of binders that are soluble in organic media, said binders being prepared from copolymers wherein $\alpha,\beta$-unsaturated dicarboxylic acid anhydrides are employed as copolymerizable starting materials.

The preparation of copolymers comprised of dicarboxylic acid anhydride groups combined in the copolymer chain, resulting from the use of such copolymerizable $\alpha,\beta$-unsaturated dicarboxylic acids or their anhydrides, is well known in view of German Patent 540,101. According to the method described in this patent, maleic acid anhydride, for example, is copolymerized with monomeric styrene or other unsaturated copolymerizable compounds such as vinyl acetate, vinylethyl ethers, and the like. It is possible, if necessary, to react also mixtures of monomeric olefinic compounds with $\alpha,\beta$-unsaturated dicarboxylic acids. However, owing to the content thereof of dicarboxylic acid anhydride groups or free hydroxyl groups, the hitherto known copolymers of this type were not acceptable for application as binders for coating compositions that must be soluble in organic solvents, even in combination with other binders such as urea-, aminotriazine- or phenol-formaldehyde resins, for instance, in baked lacquer systems. Copolymers, as described in the examples of German Patent 540,101, have a content of 30 and more percent by weight of maleic acid anhydride. They are incompatible with urea-, aminotriazine- or phenolformaldehyde resins and are useless as single binders for coating compositions, as they are unstable in the presence of solvents, water and alkalies.

German Patent 544,326 also describes the preparation of copolymers of dicarboxylic acid anhydride groups-containing copolymers of maleic acid anhydride and styrene or other monomers, that are esterified with mono- and polyols. However, in the case of esterifications carried out with monoalcohols, the resulting products, without exception, will be linear, thermoplastic and of a soluble nature, which are therefore unimportant as binders for coating compositions. If glycols are used for the process described in this patent, it is possible to obtain products which, depending upon the conditions of the condensation, are still soluble or only capable of swelling in organic solvents or are completely insoluble therein. At best, it would be possible to use as lacquer raw materials only the soluble reaction products that are difficult to prepare. However, even combinations of these with urea- or aminotriazine-formaldehyde resins resulted in coatings which, due to the high content of free hydroxyl groups, cannot have sufficient resistance to solvents, water and alkalies.

Copolymers, as described in the examples of the aforesaid German patent, having a content of 30 and more percent by weight of maleic acid anhydride in the copolymer, yield insoluble products upon being reacted solely with trivalent alcohols, before achieving compatibility with urea- or aminotriazine-formaldehyde resin.

The copolymers serving as a basis for the present novel coating compositions are prepared in known manner at raised temperatures, preferably in aromatic solvents, for example, in xylene or high-boiling mixture of aromatics. The reaction takes place in a temperature range between 50 and 250° C., preferably from 90 to 170° C., by a free radical polymerization process. This process is carried out in the presence of catalysts yielding free radicals such as peroxides, as for example, benzoyl peroxide, di-tert.-butylperoxide or azo compounds. However, the reaction can also be carried out thermally at higher temperatures. When using low-boiling monomers, or monomers that are gaseous at room temperature, it is necessary to operate under pressure. In carrying out the process according to the present invention it is generally preferred to effect the reaction with the polyols in a solvent that is the same as the solvent used for the polymerization of the monomers. In addition to the preferred aromatic solvents used, it is possible to operate in the presence of other solvents which do not participate, or only participate to small extent, in the esterification reaction, as for example aliphatic hydrocarbons, ketones, esters and tertiary alcohols.

The viscosities of the solutions of the starting polymers, measured in 60% solutions at 20° C. on the Gardner-Holdt scale, may lie within the whole range of this scale. Products having Gardner viscosities from A to D should be classified copolymers of low molecular weight, those having viscosities from E to Y copolymers of average molecular weight, and those with viscosities from Y to $Z_2$ copolymers of high molecular weight.

Since the reaction between the copolymers, in a solution of aromatics, and the polyols requires at higher temperatures relatively long periods, the content of free hydroxyl groups gives rise, possibly as side reactions, to reesterifications between these and the ester groups that are brought into the copolymer, for example, by the use of acrylic acid or methacrylic acid alkylesters, or fumaric acid dialkylesters. Methacrylic acid esters have less tendency to undergo reesterification than acrylic acid and fumaric acid esters. The extent of the reesterification also depends upon the nature of the alcohol that is combined in the monomers in the form of esters. Methanol is split off more readily than ethanol, and so on. Ester groups with secondary or tertiary alcohols show only slight or no tendency toward reesterification. This reesterification reactions are of importance in the selection of the copolymer for the reaction with trivalent alcohols. The copolymers having high molecular weights should not contain groups that are inclined to reesterify since this would produce in the course of the triol reaction, a certain amount of gel formation due to cross-linking, before achieving compatibility with the melamine resins. The reesterifications must, therefore, be confined to limits above which it is not possible to avoid the formation of insoluble or gel-like reaction products due to cross-linking, before achieving compatibility with the melamine resins.

With regard to the construction principle applying to the copolymers to be reacted with polyols, it is important to define the nature of the comonomer mixtures that, aside from the $\alpha,\beta$-unsaturated dicarboxylic acid anhydride component, take part in the copolymerization.

The mixtures of methacrylic, acrylic and/or fumaric acid alkyl esters should be conformable, in the proportions thereof, to the desired hardness and/or elasticity of the copolymers, thus imparting to them the properties required for various purposes. In general, it is possible to achieve the desired hardness through the inclusion of methylmethacrylate and the flexibility through the inclusion of acrylic and/or fumaric acid esters wherein the carbon chain in the alcohol component contains more than four carbon atoms.

In the case of mixtures containing styrene or nuclear-alkylated or nuclear-chlorinated styrenes and acrylic, methacrylic, fumaric and/or maleic acid alkyl esters, the esters of higher alcohols counteract by internal plasticization the hardness of the copolymers, for example, due to the inclusion of styrene or methylmethacrylate.

When mixtures of difficultly saponifiable vinyl esters or vinyl esters of carboxylic acids branched in $\alpha$-position, and acrylic and/or fumaric acid alkylesters are used, it is possible to modify the hardness and elasticity of the copolymer by including a methacrylic acid alkylester as additional comonomer.

Preproduct for Examples 1 to 3

944 parts by weight of an aromatic solvent mixture having boiling ranges from 150 to 170° C. are introduced into a three-necked flask equipped with a stirrer, thermometer and reflux cooler, and heated to 130 to 140° C. A mixture consisting of 16 parts by weight of benzoyl peroxide, 700 parts by weight of methylmethacrylate, 106 parts by weight of maleic acid anhydride and 590 parts by weight of 2-ethylhexylacrylate is then added within a period of 2 hours and polymerized at the same temperature for an additional 2 hours. The body content of the solution amounts to 58.6%. Upon adding another 3 grams of benzoyl peroxide and continuing the polymerization at 130 to 140° C., it is possible to arrive at a body content of 60% and a viscosity of Y on the Gardner-Holdt scale. The resin solution is clear at room temperature. The preproduct is incompatible with melamine-formaldehyde resins, even after being baked.

EXAMPLE 1

Preparation and use as a single binder 1000 parts by weight of the preproduct are mixed with 62 parts by weight of trimethylolpropane and heated under reflux at about 168 to 172° C. After a reaction period of 1 hour, the reaction product, which was still cloudy at room temperature, was found to be compatible with melamine-formaldehyde resins after being baked. After a reaction period of additional 9 hours, the product was completely clear also at room temperature. It remained clear after being diluted with isobutanol to a body content of 50%. The viscosity of the 50% solution was approximately that of U on the Gardner-Holdt scale, while the acid number was found to be 35 and the hydroxyl number about 70 (based upon the solid resin). The product dried quickly so that dust does not stick; it also exhibited outstanding fastness to light as well as good resistance to water. After baking at 200° C. the resistance with respect to aromatic solvents, water and alkalies appeared to be greatly increased.

Use of the new resin in a binder combination

70% by weight of the 50% resin solution are mixed with a 50% melamine-formaldehyde resin, prepared in accordance with Example 1 of German Patent 1,127,083, and baked at 120° C. for 30 minutes, as a film. The resulting film, having a high degree of surface hardness combined with elasticity, exhibited a good resistance toward aromatic solvents, water and alkalies.

Use of the new resin in a binder combination 70 parts by weight of the 50% resin solution are mixed with 25 parts by weight of a 60% urea-formaldehyde resin, prepared from 1 mole urea by addition of 3 moles formaldehyde to a benzine-compatibility of 1:1 to 1:3, and baked at 120° C. for 30 minutes, as a film. The resulting film, having a high degree of surface hardness combined with elasticity, exhibited a good resistance toward aromatic solvents, water and alkalies.

Use of the new resin in a binder combination 70 parts by weight of the 50% resin solution are mixed with 17 parts by weight of a 89% butylphenol-formaldehyde resin, prepared from 1 mole butylphenol and 2 moles formaldehyde in an alkaline medium at 40 to 50° C., and baked at 170° C. for 30 minutes, as a film. The resulting film was hard and corrosion resistant.

EXAMPLE 2

1000 parts by weight of the preproduct are mixed with 43 parts by weight of glycerin and heated at recycle temperature to 160 to 172° C. After 1 hour, the reaction product, which was still cloudy at room temperature, was found to be compatible with melamine-formaldehyde resin after being baked. After a reaction period of additional 9 hours, the product remained cloudy at room temperature. It was then diluted with isobutanol to a body content of 50% and still remained cloudy. The viscosity of the 50% solution was approximately that of O-P on the Gardner-Holdt scale, while the acid number was found to be 36 and the hydroxyl number about 75. The film, upon drying, was clear, and dried quickly so that dust does not stick; it also had excellent fastness to light, but less resistance to water than the product obtained according to Example 1. However, after baking at 200° C. the water resistance was found to have improved.

EXAMPLE 3

1000 parts by weight of the preproduct were heated with 68 parts by weight of 1,2,6-hexanetriol at recycle temperature to about 168 to 172° C. After a reaction period of 1 hour, the reaction product, which was still cloudy at room temperature, was found to be compatible with melamine-formaldehyde resin, after being baked. After reacting for an additional 7 hours, the product became clear at room temperature. It remained clear after being diluted with isobutanol to a body content of 50%.

The viscosity of the 50% solution was that of T–U on the Gardner-Holdt scale, the acid number was 35. The film dried quickly so that dust does not stick, it also had good elasticity. Upon baking at 200° C., the resistance toward aromatic solvents showed improvement. The resin was found to be completely compatible with urea-formaldehyde resins as well as melamine-formaldehyde resins.

From the foregoing Examples 1 to 3 it appears that the reaction products of polyols and copolymers, based on dicarboxylic acid anhydrides, react with trivalent alcohols whereby the compatibility with respect to aminoplast- and phenol-formaldehyde resins is greatly increased. At the same time, however, it appears that the products reacted with glycerin yield cloudy resin solutions in aromatic solvents and upon dilution with isobutanol, whereas for example reaction products of trimethylpropane and hexanetriol yield clear resin solutions both in aromatic solvents and on dilution with isobutanol.

EXAMPLES 4–32

Additional examples are set forth in the following table, wherein the monomers used for the preparation of the copolymers are tabulated as items (1) and (2). The polymerization is carried out with the amount of catalyst indicated as item (3) in the table (weight percent based on the total quantity of monomers used) by a procedure that calls for the addition of the monomer mixture during the period indicated at (6) to the appropriate solvent (item 5) which in some of the examples contains the chain short stopping agents listed at (4). The catalyst is dissolved in the monomer mixture. As the solvent (5) it is possible to use: Solv.=aromatic solvent mixtures having boiling ranges from 150–1170° C. and a refractive index of 1.4962 to 1.4965 or X=xylene. Upon terminating the addition of monomer, the polymerization is carried out at 130–140° C., while adding additional catalyst if necessary, until the solids content (8) and the viscosity (9) measured for this solids content (according to Gardner-Holdt at 20° C.), has been reached. At this point, there is added the quantity of trimethylolpropane (item 11) and the reaction is carried out with this trivalent alcohol at the temperature indicated at (13). After diluting with isobutanol to a solids content of 50% by weight, the viscosity indicated at (14) is measured (according to Gardner-Holdt at 20° C.) and the acid number indicated at (15) is determined, in relation to solid resin. The compatibility of the copolymer, before and after the reaction with trimethylolpropane, with a butanol-etherified melamine-formaldehyde resin, prepared according to Example 1 of German Patent 1,127,083 is indicated at (10) or (16). In carrying out this compatibility test, 70 parts by weight of copolymer or 70 parts by weight of reaction product were mixed with 30 parts by weight of melamine resin and baked at 120° C. The 0 sign means incompatible and the + mark compatible.

| Example No | 4 | 5 | 6 | 7 | 8 | 9 |
|---|---|---|---|---|---|---|
| (1) MSA-Content, percent by weight | 7.6 | 7.6 | 7.6 | 7.6 | 7.6 | 7.6 |
| (2) Other monomers, percent by weight: | | | | | | |
| MMA | 45.0 | 40.0 | 35.0 | 40.0 | 45.0 | |
| AHA | 47.4 | 52.4 | | | | 12.4 |
| BA | | | 57.4 | 52.4 | 47.4 | |
| BMA | | | | | | 80.0 |
| (3) Catalyst (BPO), percent by weight | 1.7 | ca. 1.7 | ca. 1.7 | ca. 1.7 | ca. 1.7 | ca. 1.7 |
| (4) Laurylmercaptan, percent by weight | | | | | | |
| (5) Solvent | Solv. | Solv. | Solv. | Solv. | Solv. | Solv. |
| (6) Period of Monomer Introduction/hrs | 4 | 4 | 4 | 4 | 4 | |
| (7) Theoretical Solids content, percent by weight | 60 | 60 | 60 | 60 | 60 | 60 |
| (8) Solids Content Found, percent by weight | 60 | 60.5 | 60.2 | 60 | 59.7 | 59.4 |
| (9) Viscosity of Copolymer | W-X | U-V | R-S | V-W | W | W-X |
| (10) Compatibility of Copolymer with Melamine Resin | 0 | 0 | 0 | 0 | 0 | 0 |
| (11) Grams Trimethylolpropane charged per 100 Grams of Solid Copolymer | 10.4 | 10.4 | 10.4 | 10.4 | 10.4 | 10.4 |
| (12) Trimethylolpropane conversion/hrs | 8 | 8 | 8 | 8 | 8 | 18 |
| (13) Temperature during Trimethylolpropane conversion/°C | 170 | 170 | 170 | 170 | 170 | 170 |
| (14) Viscosity of Trimethylolpropane Reaction Product | T-U | Q | M | N | S | O-P |
| (15) Acid Number | 37 | 36 | 35 | 36.5 | 34.5 | 35 |
| (16) Compatibility of Reaction Product with Melamine Resin | + | + | + | + | + | + |

NOTE.—MMA=Methylmethacrylate; AHA=Ethylhexylacrylate; BMA=Butylmethacrylate; BA=Butylacrylate; BPO=Benzoyl peroxide.

| Example No | 10 | 11 | 12 | 13 | 14 | 15 |
|---|---|---|---|---|---|---|
| (1) MSA-Content, percent by weight | 7.6 | 7.6 | 7.6 | 7.6 | 7.6 | 7.6 |
| (2) Other Monomers, percent by weight: | | | | | | |
| MMA | 30.0 | 25.0 | 30.0 | 35.0 | | 10.0 |
| BA | 42.4 | 47.4 | | | | |
| AHA | | | 42.4 | 37.4 | 52.4 | 42.4 |
| ST | 20.0 | 20.0 | 20.0 | 20.0 | 40.0 | 40.0 |
| (3) Catalyst (DBP), percent by weight | 1.15 | 1.15 | 1.15 | 1.15 | 1.15 | 1.15 |
| (4) Laurylmercaptan, percent by weight | 1.15 | 1.7 | 1.7 | 1.7 | 1.7 | 1.7 |
| (5) Solvent | Solv. | Solv. | Solv. | Solv. | Solv. | Solv. |
| (6) Period of Monomer Introduction/hrs | 4 | 4 | 4 | 4 | 4 | 4 |
| (7) Theoretical Solids Content, percent by weight | 60 | 60 | 60 | 60 | 60 | 60 |
| (8) Solids Content Found, percent by weight | 60.5 | 60.6 | 61.3 | 60.7 | 60.8 | 60.2 |
| (9) Viscosity of Copolymer | Z | V-W | X-Y | Y-Z | 0 | W-X |
| (10) Compatibility of Copolymer with Melamine Resin | 0 | 0 | 0 | 0 | 0 | 0 |
| (11) Grams Trimethylolpropane Charged per 100 Grams of Solid Copolymer | 10.4 | 10.4 | 10.4 | 10.4 | 10.4 | 10.4 |
| (12) Trimethylolpropane conversion/hrs | 6 | 8 | 8 | 8 | 8 | 8 |
| (13) Temperature during Trimethylolconversion/°C | 165 | 165 | 170 | 170 | 170 | 170 |
| (14) Viscosity of Trimethylolpropane Reaction Product | Y | U-V | U | U-V | K-L | W-X |
| (15) Acid Number | 38 | 38 | 36 | 36.5 | 35 | 34 |
| (16) Compatibility of Reaction Product with Melamine Resin | + | + | + | + | + | + |

NOTE.—MMA=Methylmethacrylate; AHA=Ethylhexylacrylate; DBP=Di-tert. butyl peroxide; BA=Butylacrylate; ST=Styrene.

| Example No | 16 | 17 | 18 | 19 | 20 | 21 |
|---|---|---|---|---|---|---|
| (1) MSA-Content, percent by weight | 7.6 | 7.6 | 7.6 | 7.6 | 7.6 | 7.6 |
| (2) Other Monomers, percent by weight: | | | | | | |
| MMA | 20.0 | 10.0 | 25.0 | 35.0 | 20.0 | 30.0 |
| AHA | 42.4 | 42.4 | 42.4 | 37.4 | 42.4 | 42.4 |
| ST | 30.0 | | | | | |
| VT | | 40.0 | 24.0 | 20.0 | 30.0 | 20.0 |
| (3) Catalyst (DBP), percent by weight | 1.15 | 1.15 | 1.15 | 1.15 | 1.15 | 1.15 |
| (4) Laurylmercaptan, percent by weight | 2.3 | 1.7 | 2.3 | 1.7 | 2.3 | 1.7 |
| (5) Solvent | Solv. | Solv. | Solv. | Solv. | Solv. | Solv. |
| (6) Period of Monomer Introduction/hrs | 4 | 4 | 4 | 4 | 4 | 4 |
| (7) Theoretical Solids Content, percent by weight | 55 | 60 | 55 | 60 | 55 | 60 |
| (8) Solids Content Found, Percent by weight | 56 | 60.6 | 55.6 | 60.7 | 56 | 61 |
| (9) Viscosity of Copolymer | U | P-Q | Q | X-Y | M-N | W |
| (10) Compatibility of Copolymer with Melamine Resin | 0 | 0 | 0 | 0 | 0 | 0 |
| (11) Grams Trimethylolpropane Conversion/hrs | 10.4 | 10.4 | 10.4 | 10.4 | 10.4 | 10.4 |
| (12) Trimethylolpropane Conversion/hrs | 5 | 8 | 8 | 8 | 8 | 8 |
| (13) Temperature during trimethylolpropane Conversion/°C | 170 | 170 | 170 | 170 | 170 | 170 |
| (14) Viscosity of Trimethylpropane Reaction Product | Y | I-J | U-V | V | R-S | R-S |
| (15) Acid Number | 36 | 35 | 35 | 37 | 34 | 36 |
| (16) Compatibility of Reaction Product with Melamine Resin | + | + | + | + | + | + |

NOTE.—MMA=Methylmethacrylate; AHA=Ethylhexylacrylate; DBP=Di-tert. butyl peroxide; ST=Styrene; VT=Vinyltoluene.

| Example No | 22 | 23 | 24 | 25 | 26 | 27 |
|---|---|---|---|---|---|---|
| (1) MSA-Content, percent by weight | 7.6 | 7.6 | 6.6 | 7.6 | 7.0 | 7.6 |
| (2) Other Monomers, percent by weight: | | | | | | |
| MMA | 25.0 | | 12.5 | | 24.0 | 35.0 |
| DO | | 40.0 | 35.0 | 40.2 | | |
| AHA | 42.4 | | 45.8 | | | |
| MA | | 52.4 | | | | |
| VT | 25.0 | | | | | |
| BA | | | | 52.2 | 24.0 | 35.0 |
| VV | | | | | 45.0 | 22.4 |
| (3) Catalyst, percent by weight: | | | | | | |
| DBP | 1.15 | | | | | |
| BPO | | 3.8 | 2.5 | 2.8 | 2.26 | 1.8 |
| (4) Laurylmercaptan, percent by weight | 2.3 | | | | | |
| (5) Solvent | Solv. | Xylene | Xylene | Xylene | Solv. | Solv. |
| (6) Period of Monomer Introduction/hrs | 4, dodecene is introduced in solvent VV, residual monomer introduction .10. | | | | | |
| (7) Theoretical Solids Content, percent by weight | 55 | 60 | 63 | 60 | 60 | 60 |
| (8) Solids Content Found, percent by weight | 55.3 | 51 | 53.5 | 52 | 57 | 58 |
| (9) Viscosity of Copolymer | M-N | C-D | A | A | I-J | 0 |
| (10) Compatibility of Copolymer with Melamine Resin | 0 | 0 | 0 | 0 | 0 | 0 |
| (11) Grams Trimethylol-propane Conversion/hrs. | 10.4 | 12.1 | 10.7 | 11.9 | 10.5 | 10.8 |
| (12) Trimethylolpropane Conversion/hrs | 8 | 8 | 8 | 8 | 5 | 8 |
| (13) Temperature during trimethylolpropane Conversion/° C | 170 | 145 | 150 | 150 | 170 | 170 |
| (14) Viscosity of Trimethylolpropane Reaction Product | M-N | T-U | 55% F | 54% D | M-N | I |
| (15) Acid Number | 34 | 44 | 36.7 | 40 | 20 | 35 |
| (16) Compatibility of Reaction Product with Melamine Resin | + | + | + | + | + | + |

Note.—MMA=Methylmethacrylate; AHA=Ethylhexylacrylate; BPO=Benzoyl peroxide; VV=Vinyl versatic ester—VV-911 (Trademark of Shell); VT=Vinyltoluene; DO=1-dodecene; BA=Butylacrylate.

| Example No | 28 | 29 | 30 | 31 | 32 |
|---|---|---|---|---|---|
| (1) MSA-Content, percent by weight | 8.5 | 15.0 | 7.6 | 7.6 | 7.6 |
| (2) Other Monomers, percent by weight: | | | | | |
| MMA | 49.0 | | | | 50.0 |
| AA | | 45.0 | | | |
| MA | | | 52.4 | | |
| BA | 42.5 | | | | |
| DO | | 40.0 | | 40.0 | |
| OCT | | | 40.0 | | |
| AHA | | | | | 42.4 |
| DBF | | | | 52.4 | |
| (3) Catalyst, (BPO) percent by weight | 2.5 | 3.8 | 3.8 | 3.5 | 1.5 |
| (4) Laurylmercaptan, percent by weight | | | | | |
| (5) Solvent | Solv. | Xylene | Xylene | Xylene | Solv. |
| (6) Period of Monomer Introduction/hrs | 4, olefine introduced, residual monomer introduction in 10 hrs. | | | | |
| (7) Theoretical Solids Content, percent by weight | 60 | 60 | 60 | 60 | 60 |
| (8) Solids Content Found, percent by weight | 59.5 | 53 | 51 | 60.1 | |
| (9) Viscosity of Copolymer | $Z_1$ | F | E | A | Z-$Z_1$ |
| (10) Compatibility of Copolymer with Melamine Resin | 0 | 0 | 0 | 0 | 0 |
| (11) Grams Trimethylolpropane Conversion/hrs | 10.0 | 23.5 | 12.1 | 12.2 | |
| (12) Trimethylolpropane Conversion/hrs | 7 | 1 | 8 | 8 | 8 |
| (13) Temperature during Trimethylolpropane Conversion/° C | 165 | 145 | 145 | 145 | 170 |
| (14) Viscosity of Trimethylolpropane Reaction Product | W-X | Z-$Z_1$ | V-W | A | N |
| (15) Acid Number | 42 | 80 | 43 | 47 | 38 |
| (16) Compatibility of Reaction Product with Melamine Resin | + | + | + | + | + |

Note.—MMA=Methylmethacrylate; AHA=Ethylhexylacrylate; BPO=Benzoyl peroxide; BA=Butylacrylate; OCT=1-octene; AA=Ethylacrylate; MA=Methylacrylate; DO=1-dodecene; DBF=Dibutylfumarate.

WEATHERING TESTS 70 grams of the 50% solutions from each of Examples 1, 4, 5, 23, 26 and 27, mixed with 30 grams of a 50% melamine resin solution prepared in accordance with Example 1 of German Patent 1,127,083 were pigmented with titanium dioxide (binder to pigment ratio 1:0.7) and baked at 120 °C. for 30 minutes. They were then subjected to weathering. As a result, it was found that the products with methylmethacrylate, ethylhexylacrylate (from Example 1, 4, 5) and the product with 1-dodecene and methacrylate (from Example 23) display a much higher gloss keeping quality than conventional alkyd resins having as a basis coconut or castor oil fatty acids. The products with vinyl versatic ester-VV-911 (trademark of Shell) on weathering, retain their gloss even better than the products from Examples 1, 4, 5 and 23.

One way of carrying out the process is characterized in that the copolymers used therein are copolymers containing as comonomers methacrylic acid esters, acrylic acid esters and/or fumaric acid esters.

Another way of carrying out the process is characterized in that the copolymers used therein are copolymers containing as comonomers styrene, methacrylic acid esters, acrylic acid esters and/or fumaric acid esters.

Another way of carrying out the process is characterized in that the copolymers used therein are copolymers in which the styrene has been completely or partially replaced with vinyl toluene, vinyl xylene or nuclear chlorinated styrenes, whereby also mixtures of these monomers can be copolymerized together.

A further way of carrying out the process is characterized in that the copolymers used therein are copolymers containing as comonomers mono-olefines with terminal double bonds, that are not branched at the double bonds, acrylic acid esters and/or fumaric acid esters and, if necessary, also methacrylic acid esters.

Another way of carrying out the process is characterized in that the copolymers used therein are copolymers containing as comonomers difficultly saponifiable vinyl esters, such as vinyl esters of carboxylic acids branched in α-position, acrylic acid esters and/or fumaric acid esters and, if necessary, also methacrylic acid esters.

Another way of carrying out the process is characterized in that the copolymers used therein are copolymers containing as comonomers unbranched mono-olefines having terminal double bonds and difficultly saponifiable vinyl esters.

A preferred way of carrying out the process is characterized in that the copolymers used therein or copolymers prepared from 5 to 10% by weight of maleic acid anhydride, 20 to 60% by weight of methylmethacrylate, 30 to 70% by weight of acrylic acid esters and/or fumaric acid esters, the alkyl radicals of which have 1 to 10 carbon atoms.

Another preferred way of carrying out the process is characterized in that the copolymers used therein are copolymers prepared from 5 to 10% by weight of maleic acid anhydride, 10 to 50% by weight of styrene, 0 to 50% by weight of methylmethacrylate, 10 to 85% by weight of acrylic acid esters and/or fumaric acid esters, the alkyl radicals of which have 1 to 10 carbon atoms.

A particularly preferred way of carrying out the process is characterized in that the copolymers used therein are copolymers prepared from 5 to 10% by weight of maleic acid anhydride, 10 to 50% by weight of a monoolefine of the formula $H_2C{=}CHR$, wherein R is a hydrogen atom or a straight chain alkyl radical with 1 to 20 carbon atoms or a branched alkyl radical with 1 to 20 carbon atoms, 40 to 85% by weight of acrylic acid esters and/or fumaric acid esters, the alkyl radicals of which have 1 to 10 carbon atoms, and 0 to 30% by weight of methylmethacrylate.

A particularly preferred way of carrying out the process is characterized in that the copolymers used therein are copolymers prepared from 5 to 10% by weight of maleic acid anhydride, 20 to 50% by weight of difficultly saponifiable vinyl esters of the formula

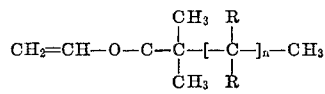

wherein R=hydrogen atom, —methyl, —$C_2H_5$, —$C_3H_7$, —$C_4H_9$ or —$C_6H_5$ radicals and $n=0$, 1, 2, 3 to 6, and 40 to 45% by weight acrylic acid esters and/or fumaric acid esters, the alkyl radicals of which have 1 to 10 carbon atoms, and 0 to 30% by weight of methylmethacrylate.

Another particularly preferred way of carrying out the process is characterized in that the copolymers used therein are copolymers prepared from 5 to 10% by weight of maleic acid anhydride, 20 to 70% by weight of difficultly saponifiable vinyl esters of the formula

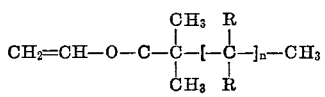

wherein R=hydrogen atom, —methyl, —$C_2H_5$, —$C_3H_7$, —$C_4H_9$ or —$C_6H_5$ radicals and $n=0$, 1, 3 to 6, and 5 to 30% by weight of a monoolefine having the formula $H_2C{=}CHR_1$, wherein $R_1$=hydrogen atom, straight chain or branched alkyl radical with 1 to 20 carbon atoms.

According to a preferred embodiment of the present invention there are obtained end products consisting of reaction products of copolymers and tri- to hexavalent alcohols, which may contain copolymerized therewith acrylic acid esters and/or fumaric acid esters in the form of their monomers such as dibutylfumarate, di-2-ethylhexylfumarate, butylacrylate and/or 2-ethylhexylacrylate.

According to another preferred embodiment of the present invention there are obtained end products consisting of copolymers that contain copolymerized therein 5 to 10% by weight of maleic acid anhydride and 10 to 50% by weight of mono-olefines, whereby in accordance with this preferred embodiment the following compounds are used for such copolymerization: 1-butene, 1-pentene, 1-hexene, 1-heptene, 1-octene, 1-nonene, 1-decene, 1-undecene and 1-dodecene, and 40 to 85% by weight of acrylic acid esters and/or fumaric acid esters, the alkyl radicals of which have 1 to 10 carbon atoms, whereby the following alkyl radicals are preferred: methyl, ethyl, propyl, butyl, hexyl, octyl, 2-ethylhexyl and decyl.

The vinyl versatic 911 ester is known in the literature. Thus, the copolymer of such vinyl esters with vinyl acetate is described in the VII Congress FATIPEC, pages 49–60 (Verlag Chemie GmbH, Weinheim, Bergstrasse) in the paper submitted by P. Bruin et al. entitled "Latices Based on Copolymers of Branched Carboxylic Acids and Vinyl Acetate." The vinyl versatic acid 911 ester is essentially a vinyl ester of a branched chain synthetic $C_{9-11}$ monocarboxylic acid. This $C_{9-11}$ acid is prepared by a process developed by Koninklijke Shell Laboratorium, Amsterdam, from a mixture of $C_9$- and $C_{10}$-olefines with carbon monoxide and water.

The reaction is based upon the pioneer work of Dr. H. Koch (Brennstoff-Chemie 36 [1955], 321, and Fette, Seifen, Anstrichmittel 39 [1957], 494). The monocarboxylic acids are completely saturated and are substituted to a very high degree at the carbon atom in α-position. Acids having 2 hydrogen atoms are not present and only 6 to 7% of these acids contain one hydrogen atom.

The commercial product vinyl versatic acid 911 ester has the following characteristics:

| | |
|---|---|
| Color (Hazen) | 15 |
| Average molecular weight | 197 |
| Specific weight | 0.885–0.890 |
| Viscosity at 20° C. cps./hr. | 2.2 |
| Vapor pressure at 30° C. mm. Hg | 1 |
| Vapor pressure at 110° C. mm. Hg | 29 |
| Flash-point (PM, geschl. T.) ° C. | 82 |
| Refractive index $n_D^{20}$ | 1.439 |
| Solubility in water at 20–80° C. p.p.m. | 50 |
| Solubility of water in esters at 22° C. percent by weight | 0.09 |
| Solubility of water in esters at 60° C. do | 0.12 |
| Acid number | 1 |
| Bromine number | 78–80 |
| Latent heat of evaporation Kcal./mol | 12.1 |
| Heat of polymerization Kcal./mol | 23 |
| Boiling range at 100 mm. Hg ° C. | 129–180 |

We claim:

1. A process for the preparation of a soluble binder comprising reacting (1) a copolymer obtained by free radical copolymerization of (a) at least two polymerizable monomers containing ethylenic unsaturation, selected from a group consisting of acrylic acid esters, methacrylic acid esters, styrene, vinyltoluene, vinylxylene, nuclear-halogenated styrenes, mono-olefines that are unbranched at the double-bond and vinyl esters of carboxylic acids branched at the α position and (b) from about 1% to about 23% by weight of at least one α,β unsaturated dicarboxylic acid anhydride, with (2) at least one trivalent aliphatic alcohol, to an acid number of about 5 to 60 and a hydroxyl number of about 20 to 120.

2. A process according to claim 1, wherein the acid number is from about 20 to about 50 and the hydroxyl number from about 30 to about 90.

3. A process according to claim 1, wherein (2) contains said trivalent aliphatic alcohol and an alcohol selected from the group consisting of monohydric and dihydric alcohols.

4. A process according to claim 1, wherein the α,β dicarboxylic acid anhydride is selected from the group consisting of maleic anhydride and itaconic anhydride.

5. A process according to claim 4 wherein the anhydride is maleic anhydride in an amount within the approximate range of 5 to 10% by weight of the copolymer.

6. A process according to claim 4 wherein the anhydride is itaconic acid anhydride in an amount within the approximate range of 6 to 12% by weight of the copolymer.

7. A process according to claim 1, wherein the trivalent alcohol used is a member of the group consisting of trimethylolalkanes and 1,2,6 hexanetriol.

8. A process according to claim 1, wherein the trivalent alcohol is trimethylpropane ranging from about 0.18 to about 1.5 mole per mole of anhydride.

9. A process according to claim 1, wherein (1) is obtained from about 5% to about 10% by weight of maleic anhydride, about 20% to about 60% by weight of methylmethacrylate, and about 30% to about 70% by weight of an alkylester selected from the class of acrylic acid and fumaric acid esters, the alkyl moiety of said alkylesters having from 1 to 10 carbon atoms.

10. A process according to claim 1, wherein (1) is obtained from about 5% to about 10% by weight of maleic anhydride, about 10% to about 50% by weight of styrene, up to about 50% by weight of methylmethacrylate, and about 10% to about 85% by weight of an alkylester selected from the group consisting of acrylic acid and fumaric acid esters, the alkyl moiety of said alkylesters having from 1 to 10 carbon atoms.

11. A process according to claim 1, wherein (1) is obtained from about 5% to about 10% by weight of maleic anhydride, from about 10% to about 50% by weight of a mono-olefine of the formula $H_2C=CHR$, wherein R is selected from the group of hydrogen, alkyl having 1 to 20 carbon atoms, branched alkyl having 1 to 20 carbon atoms, from about 40% to about 85% by weight of an alkylester selected from the class of acrylic acid ester and fumaric acid ester, the alkyl moiety of said ester having from 1 to 10 carbon atoms, and up to about 30% by weight of methylmethacrylate.

12. A process according to claim 1, wherein (1) is obtained from about 5% to about 10% by weight of maleic anhydride, about 20% to about 50% by weight of vinyl esters of the formula

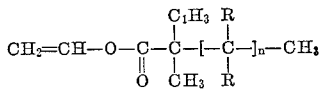

wherein R is a member of a group consisting of —methyl, $-C_2H_5$, $-C_4H_9$, $-C_6H_5$ and $n=0-6$, and about 40% to 45% by weight of methylmethacrylate.

13. The soluble binder for coating compositions prepared by the process of claim 1.

References Cited

UNITED STATES PATENTS 3,085,986    4/1963    Muskat _____ 260—78.5 XR
3,336,259    8/1967    Zimmmerman et al.

JOSEPH L. SCHOFER, Primary Examiner

J. KIGHT III, Assistant Examiner

U.S. Cl. X.R.

260—33.6, 851, 855, 856